United States Patent [19]
Chang

[11] Patent Number: 5,098,774
[45] Date of Patent: Mar. 24, 1992

[54] DIVALENT METAL SALTS OF SULFONATED NOVOLAK RESINS AND METHODS FOR TREATING FIBROUS POLYAMIDE MATERIALS THEREWITH

[76] Inventor: John C. Chang, P.O. Box 33427, St. Paul, Minn. 55133-3427

[21] Appl. No.: 508,597

[22] Filed: Apr. 11, 1990

Related U.S. Application Data

[60] Division of Ser. No. 273,637, Nov. 18, 1988, abandoned, which is a continuation of Ser. No. 930,772, Nov. 14, 1986, abandoned.

[51] Int. Cl.⁵ .................... B32B 3/02; B32B 7/00; B32B 25/00; C09B 67/00
[52] U.S. Cl. .................... 428/267; 8/560; 8/929; 428/96; 428/395
[58] Field of Search .............. 428/96, 267, 395; 8/929, 560

[56] References Cited

U.S. PATENT DOCUMENTS

| | | | |
|---|---|---|---|
| T949,001 | 8/1976 | Pacifici . | |
| 3,322,488 | 5/1967 | Feeman | 8/115.5 |
| 3,398,182 | 8/1968 | Guenthner et al. | 260/455 |
| 3,553,157 | 5/1972 | Gilgien et al. | 8/65 |
| 3,574,791 | 4/1971 | Sherman | 260/884 |
| 3,926,548 | 12/1975 | Moriyama et al. | 8/115.5 |
| 3,959,559 | 5/1976 | Kimoto et al. | 428/394 |
| 4,013,627 | 3/1977 | Temple | 526/245 |
| 4,024,178 | 5/1977 | Landucci | 260/472 |
| 4,147,851 | 4/1979 | Raynolds | 526/245 |
| 4,322,512 | 3/1982 | Lenox | 525/420 |
| 4,329,391 | 5/1982 | McAlister | 428/265 |
| 4,343,923 | 8/1982 | Lenox et al. | 525/426 |
| 4,501,591 | 2/1985 | Ucci et al. | 8/495 |
| 4,540,497 | 9/1985 | Chang et al. | 252/8.8 |
| 4,563,190 | 1/1986 | Topfl | 8/524 |
| 4,579,762 | 4/1986 | Ucci | 428/95 |
| 4,592,940 | 6/1986 | Blyth et al. | 428/96 |
| 4,606,737 | 8/1986 | Stern | 8/115 |

FOREIGN PATENT DOCUMENTS

| | | |
|---|---|---|
| 2666884 | 4/1984 | Australia . |
| 0016658 | 10/1980 | European Pat. Off. . |
| 0102690 | 3/1984 | European Pat. Off. . |
| 48-8789 | 3/1973 | Japan . |
| 1499136 | 1/1978 | United Kingdom . |

OTHER PUBLICATIONS

Brownewell, Ralph G., "Two New Chemicals Create Better Multicolored Nylons", Am. Dyestuff Reporter, vol. 68, No. 3, 1979, pp. 38–41.

Sulfonation & Related Reactions, E. E. Gilbert, Interscience Publishers, (1965), pp. 374–383.

Phenolic Resins, A. Knop et al., Springer-Verlag (1985), pp. 46–47.

Primary Examiner—John Kight, III
Assistant Examiner—T. Mosley
Attorney, Agent, or Firm—Gary L. Griswold; Walter N. Kirn; Carole Truesdale

[57] ABSTRACT

Compositions comprising normally solid, water-soluble divalent metal salts of partially sulfonated novolak resins are provided. These divalent salts of partially sulfonated novolak resins ae useful for imparting to fibrous polyamide materials stain resistance to natural and synthetic acid colorants. Also provided are methods of preparing these resins, methods of treating fibrous polyamide materials with these resins, and fibrous polyamide materials so treated.

14 Claims, No Drawings

DIVALENT METAL SALTS OF SULFONATED NOVOLAK RESINS AND METHODS FOR TREATING FIBROUS POLYAMIDE MATERIALS THEREWITH

This is a division of application Ser. No. 07/273,637 filed Nov. 18, 1988 which is a continuation of application Ser. No. 06/930,772 filed Nov. 14, 1986, both abandoned.

This invention relates to sulfonated novolak resins which are useful in providing stain resistance to polyamide materials and methods for providing stain resistance to polyamide materials, such as nylon and wool carpets, nylon, wool, and silk fibers and fabrics, and natural and synthetic leathers.

Fibrous polyamide articles such as nylon and wool carpets, nylon, wool, and silk fabric, natural leather, and synthetic leathers such as Ultrasuede ™ are particularly susceptible to staining by natural and artificial acid colorants such as are commonly found in many foods and beverages. A need has long been felt for processes for economically providing such fibrous polyamide articles with resistance to staining by acid colorants. Particularly desirable are processes by which stain resistance can be imparted to fibrous polyamide articles during conventional processing and treating operations.

U.S. Pat. No. 4,501,591 (Ucci et al.) discloses a process for providing stain-resistant polyamide carpets in which a sulfonated phenol-formaldehyde condensation product and an alkali metal silicate are added to the dye liquor in a continuous dyeing process, followed by steaming, washing, and drying the carpet.

U.S. Pat. No. 4,592,940 (Blyth et al.) discloses a process for imparting stain resistance to nylon carpet by immersing the carpet in a boiling aqueous solution of a selected phenol-formaldehyde condensation product at a pH of 4.5 or less. The process is carried out in conventional beck dyeing apparatus subsequent to dyeing (generally at a pH of 6.5 to 8.0) by either acidifying the bath to pH 4.5 or less or draining the dye bath and then replacing the dye bath with a corresponding amount of water adjusted to pH 4.5 or less. Blyth et al. disclose that insufficient condensation product for imparting stain resistance is picked up by the carpet at pH greater than 4.5 and temperature less than 95° C.

U.S. Pat. No. 4,579,762 (Ucci) discloses stain-resistant nylon carpet in which the nylon fibers are made from polymer modified to contain, as an integral part of its polymer chain, sufficient aromatic sulfonate units to improve the acid dye resistance of the fibers and in which the backing adhesive contains a fluorochemical in an amount sufficient to render the backing a barrier to liquids.

Japanese Examined Patent Application (Kokoku) No. 48-8789 (1973) (Meisei) discloses a method for treatment of dyed polyamide fibers to improve anti-static and anti-melting properties and moisture resistance in which a ligand oligomer, formed from sulfonated 4,4'-dihydroxydiphenylsulfone-formaldehyde condensate with a metal compound prepared from citric acid and a metal chloride, metal oxide, or organic metal salt, is applied to fiber from a treatment bath or, alternatively, the sulfonated 4,4'-dihydroxydiphenylsulfone-formaldehyde condensate and a metal compound prepared from a metal salt, citric acid and hydroxy acetic acid, are added to the treatment bath separately.

U.S. Pat. No. 4,329,391 (McAlister) discloses the treatment of synthetic fibers with a sulfonated polyester stain-releasing finish in an aqueous bath which includes the addition of water-soluble salts to the aqueous fabric treating bath. The treatment provides a finish which enhances oily soil release during after-stain laundering.

U.S. Defensive Publication No. T949,001 (Pacifici) discloses a process for improving the durability of water-dispersible polyester and polyester amide textile finishes on fabric where the fabric, after application of the finish, is treated with an aqueous solution of polyvalent metal salts.

U.S. Pat. No. 3,322,488 (Feeman) discloses sulfomeihylated condensation products of bisphenols and aldehydes for use in reserving synthetic polyamide and polyurethane fibers to render them resistant to acid and direct dyes.

U.S. Pat. No. 3,663,157 (Gilgien et al.) discloses a process for printing nylon fabric with disperse or monosulfonated acid dyes wherein the fabric is pretreated with an aqueous solution of a fiber-substantive, water-soluble, anionic resist which is a polycondensate of a diarylsulfone containing at least one phenolic hydroxy group with formaldehyde.

British Patent Specification No. 1,499,136 (Dainippon) discloses a fixing agent for improving the fastness properties of dyeings on polyamide fibers comprising a condensation product of 4,4'-dihydroxydiphenylsulfone, 4,4'-dihydroxydiphenylsulfonesulfonic acid, and a $C_1$ to $C_4$ aliphatic aldehyde, or its metal salt, the condensation product having a mean molecular weight of from 5000 to 30,000 and a weight ratio of carbon atom content to sulfur atom content of from 3.0:1 to 4.8:1. Where the product is a metal salt, all sulfonic acid moieties in the condensation product do not react with the salt reactant and free sulfonic acid moieties remain in the condensation product.

Australian Patent Application No. 26668/84 (Hoechst) discloses a process for the level dyeing of synthetic fibers with disperse dyestuffs in which dyeing is conducted in the presence of a mixture of a) ethoxylated unsaturated carboxylic acids of 12 to 18 carbon atoms and an ethylene oxide content of 10 to 40 units and either b) sulfur-containing alkylphenol-formaldehyde condensation products, or c) specified sulfosuccinic acid half-esters of alkoxylated polynuclear alkylphenols which can contain sulfonic acid metal salt moieties.

U.S. Pat. No. 3,926,548 (Moriyama et al.) discloses aminated hydrophobic fibers having a surface resistant to anionic dyes, the surface of the fibers having been treated with a compound having groups capable of linking to amino groups in the fibers to form covalent bonds. Such groups include halotriazinyl, halopyrimidinyl, haloquinoxalyl, haloacrylamido, vinylsulfo groups, etc., or any other groups that can produce these groups. Also suitable are compounds having anionic groups, for example, sulfonate, carboxylate, sulfate, phosphate groups, etc., besides the highly reactive groups capable of reacting with amino groups.

U.S. Pat. No. 3,959,559 (Kimoto et al.) discloses a process for producing modified synthetic fibers in which the fibers are treated with a reaction product of a specified s-triazine or piperazine derivative, with a specified derivative of polyoxyethylene and further adhering onto the resulting fibers a specified aromatic sulfonic acid. The modified fibers resist contamination from liberated dyestuff or ionic contaminants during laundering or dry cleaning.

U S. Pat. No. 4,322,512 (Lenox) discloses treating a polyamide textile material with a substituted trimellitic anhydride compound, the treatment decreasing the textile material's affinity for acid dyes.

U.S. Pat. No. 4,343,923 (Lenox et al.) discloses a method for decreasing a textile material's affinity for acid dyes in which the textile material is pretreated with an acylimidazole compound.

Brownewell, Ralph G., "Two New Chemicals Create Better Multicolored Nylons," *American Dyestuff Reporter*, Vol. 68, No. 3, 1979, pp 38–41, discloses processes for providing nylon fabrics which are resistant to coloration by acid dyes by treatment with Sandospace S, a product of Sandoz Colors and Chemicals, believed to be a benzenoid triazine derivative.

U.S. Pat. No. 4,563,190 (Topfl) discloses a dyeing assistant useful in the dyeing of polyamide fibers with acid dyes. The dyeing assistant is a mixture of (A) a sulfonated condensation product of hydroxyaryl compounds and formaldehyde or a sulfonated N-aryl-melamine derivative, and (B) a specified quaternary ammonium compound, and, optionally, (C) a siloxane/oxyalkylene copolymer and (D) a polar solvent.

European Patent Application No. 83,303,341.8 discloses increased exhaustion of fluorochemical treating agents for providing oil and water repellency by the addition of salt compounds such as sodium sulfate and citrate, magnesium chloride, ammonium sulfate and chloride, aluminum sulfate, calcium chloride, and potassium chloride.

U.S. Pat. No. 4,013,627 (Temple) discloses a fluorochemical polymer for treating fabrics to provide oil and water repellency, the polymer being derived from fluorochemical acrylate monomer, a vinyl monomer free of non-vinylic fluorine, and a vinyl monomer which contains an onium ionic group. Salts, such as alkali metal sulfates and low molecular weight alkylamine hydrochlorides, may be added, as adjuvants, to textile treating baths containing the fluorochemical polymer to aid deposition of the polymer onto the fabric being treated.

European Patent Application No. 0,016,658 (Monsanto) discloses soil-resistant carpet yarns prepared by coating the yarn with a soil retardant agent such as a fluorochemical and a retaining agent such as zirconium oxide.

The present invention, in one aspect, provides sulfonated novolak resin compositions comprising normally solid, water-soluble, divalent metal salts of partially sulfonated novolak resins. The compositions comprising the divalent metal salts of the partially sulfonated novolak resins, hereinafter called "novolak salts", are substantially free of sulfonic acid moieties, —$SO_3H$, i.e., contain less than 1 mole percent sulfonic acid moieties, and typically less than 0.1 mole percent sulfonic acid moieties. The novolak salts of this invention are particularly useful for imparting to fibrous polyamide materials stain resistance to natural and synthetic acid colorants.

This invention, in another aspect, provides a method for preparing the novolak salt comprising reacting an aromatic compound with a sulfonating agent to form a sulfonated aromatic compound, condensing the sulfonated aromatic compound with a non-sulfonated phenolic compound and an aldehyde or aldehyde precursor to form a sulfonated condensate, and reacting the condensate with a divalent metal oxide or hydroxide, or divalent metal salts of weak acids, e.g., carbonic acid, boric acid, and carboxylic acids.

This invention in a further aspect, provides a method for preparing the novolak salt comprising reacting a sulfonated aromatic divalent salt with a non-sulfonated phenolic compound and an aldehyde or aldehyde precursor.

This invention, in another aspect, provides a method for imparting to fibrous polyamide materials stain resistance to natural and synthetic acid, i.e., anionic, colorants, or dyes, comprising contacting the fibrous polyamide materials with an aqueous treating solution comprising the novolak salt of this invention. The novolak salt is in the treating solution in a sufficient amount and the solution is in contact with the fibrous polyamide material for sufficient time at a given temperature to impart the stain resistance.

This invention still further provides a method for imparting to fibrous polyamide materials stain resistance to natural and synthetic acid colorants comprising contacting the fibrous polyamide materials with an aqueous treating solution of the novolak salt and a water-soluble supplemental divalent metal salt. The supplemental divalent metal salt is the divalent metal salt of an inorganic or carboxylic acid. The novolak salt and the supplemental metal salt are in the treating solution in sufficient amounts and the solution is in contact with the fibrous polyamide material for sufficient time at a given temperature to impart the stain resistance to acid colorants. The combination of the novolak salt and the supplemental divalent metal salt imparts surprisingly effective stain resistance to the polyamide materials using reduced amounts of the novolak salt and permits application of the novolak salt over a wider pH range.

The invention further provides for the presence of a fluorochemical in the treating solution containing the novolak salt and, optionally, the supplemental divalent metal salt, or in a spin finish composition containing a novolak salt to impart to the polyamide material oil and water repellency in addition to stain resistance to acid colorants.

The invention further provides an aqueous solution useful in imparting stain resistance to acid colorants to fibrous polyamide materials the solution comprising the normally solid, water-soluble divalent metal salt of a partially sulfonated novolak resin which is substantially free of sulfonic acid moieties. The solution may also optionally contain the supplemental divalent metal salt.

The invention also provides fibrous polyamide materials, such as nylon, silk, and wool fabrics, yarns, and fibers, nylon and wool carpets, and natural and synthetic leather such as Ultrasuede TM synthetic suede which have stain resistance to acid colorants imparted by treating the polyamide material with an aqueous solution containing the novolak salt.

The present invention still further provides fibrous polyamide materials having oil and water repellency as well as stain resistance to acid colorants by including a fluorochemical in the novolak salt treating solution or applying the fluorochemical to the fibrous polyamide material subsequent to the application of the novolak salt.

The divalent metal salts of partially sulfonated novolak resins, i.e, the novolak salts, can be prepared by reacting a divalent metal oxide or hydroxide, or divalent metal salts of weak acids with the sulfonic acid form of the sulfonated novolak resin. Alternatively, the novolak salt can be prepared by reacting the divalent salt form of a sulfonated aromatic compound with nonsulfonated phenolic compound and, an aldehyde, or aldehyde precursor, e.g., paraformaldehyde or hexamethylenetetramine. Suitable divalent metal oxides or hydroxides include, for example, oxides and hydroxides of calcium, magnesium, and zinc. Divalent metal salts of weak acids include, for example, carbonates, bicarbonates, acetates, formates and borates of calcium, magnesium and zinc.

The sulfonated novolak resins which are reacted with the metal oxide or hydroxide, or the divalent metal salt of a weak acid include known substances such as those well-known compounds which are condensation products of aldehydes or aldehyde precursors with sulfonated aromatic compounds and nonsulfonated phenolic compounds. Aldehydes include, for example, formaldehyde, acetaldehyde, furfuraldehyde, or benzaldehyde. Non-sulfonated phenolic compounds include phenol, halogenated phenol, e.g., chlorophenol, trifluoromethylphenol, naphthol, dihydroxydiphenylsulfide, resorcinol, catechol, hydroxyarylcarboxylic acid, e.g., salicylic acid, hydroxyphenylphenyl ether, phenylphenol, alkylphenol, e.g., nonylphenol or cresol, dihydroxydiphenylsulfone, and bis(hydroxyphenyl)alkane, e.g., 2,2-bis(hydroxyphenyl)propane or 2,2-bis(hydroxyphenyl)hexafluoropropane. Sulfonated aromatic compounds include the sulfonated forms of the above-mentioned non-sulfonated phenolic compounds and sulfonated naphthalene, sulfonated diphenyl ether, and sulfoalkylated phenol, e.g., sulfomethylated dihydroxydiphenyl sulfone. The sulfonated novolak resin is partially sulfonated, i.e., has a sulfonic acid equivalent weight of about 300-1200, preferably 400-900. When the sulfonic acid equivalent weight is below about 300, the resulting novolak salt is insufficiently substantive to fibrous polyamide materials. When the sulfonic acid equivalent weight is above about 1200, the resulting novolak salt is not sufficiently water-soluble for application to the fibrous polyamide materials at conventionally used application temperatures. Generally, the sulfonated novolak resin has a carbon atom to sulfur atom ratio of at least 5:1, and as much as 7:1 or more. Examples of such resins are disclosed in U.S. Pat. No. 4,592,940 (Blyth et al.) which is incorporated herein by reference for this purpose. Sulfonation of phenolic compounds is taught, for example, in *Sulfonation and Related Reactions*, E. E. Gilbert, Interscience Publishers, (1965). Condensation of phenol-formaldehyde resins is taught, for example, in *Phenolic Resins*, A. Knop et al., Springer-Verlag, (1985).

A method for preparing the novolak salt comprises reacting an aromatic compound, e.g., phenol, with a sulfonating compound, e.g., sulfuric acid, chlorosulfonic acid, alkaline sulfite, to form a sulfonated aromatic compound and then condensing the sulfonated aromatic compound with a non-sulfonated phenolic compound and an aldehyde or aldehyde precursor to form a sulfonated condensate, and then reacting the condensate with the divalent metal oxide or hydroxide, or the divalent metal salt of a weak acid, to yield an aqueous solution having a pH of at least 3. Generally, the resulting novolak salt composition prepared in this manner (e.g., using sulfuric acid as the sulfonating agent) contains a minor amount, e.g., up to about 20 weight percent based on total solids of divalent metal sulfate, i.e., magnesium, calcium, or zinc sulfate, due to the presence of residual sulfuric acid resulting from the sulfonation reaction.

Another method of preparing the sulfonated novolak salt comprises condensing a divalent salt of a sulfonated compound, e.g., phenolsulfonic acid calcium salt, with a phenolic compound, e.g., dihydroxydiphenylsulfone, and an aldehyde or aldehyde precursor, e.g., formaldehyde.

The novolak salt composition prepared by the above-described methods may contain small amounts, i.e., less than about 20 weight percent, generally less than 10 weight percent, of materials other than the novolak salt and the divalent metal sulfate, e.g., unreacted starting materials and reaction by-products. The presence of the unreacted starting materials and reaction by-products generally does not interfer with the performance of the novolak compositions in imparting acid dye stain resistance to fibrous polyamide materials. If desired, the unreacted starting materials, the reaction by-products, and the divalent metal sulfates can be removed from the novolak salt composition using well-known techniques such as, for example, by dialysis or fractional extraction, to yield a composition consisting of, or consisting essentially of the normally solid, water-soluble divalent metal salt of the partially sulfonated novolak resin.

The method for treating fibrous polyamide materials of this invention can be carried out in several different ways. One method comprises the steps of adding to a dyebath, before, during, or after dyeing of the fibrous polyamide material, such as in a dye beck with nylon carpet, at least 0.15 weight percent novolak salt solids based on the weight of the fabric, i.e., the fibrous polyamide material, ("owf"), immersing the polyamide material in the dyebath for a time and temperature sufficient to exhaust, i.e., substantially deposit all, the novolak salt onto the polyamide material, removing the treated polyamide material from the dyebath, and drying the removed polyamide material.

Another method comprises the steps of applying to the polyamide material an aqueous solution comprising at least 0.15 weight percent novolak salt solids owf, such as during continuous dyeing of nylon carpet using Kuster ™ or Otting ™ continuous dyeing equipment, steaming the treated polyamide material for a time sufficient to effect adherence of the sulfonated novolak salt to the polyamide material, and drying the steamed polyamide material.

A further method comprises the steps of padding an aqueous solution comprising at least 0.15 weight percent of the novolak salt solids owf onto the polyamide material and drying the padded polyamide material.

A still further method comprises applying a spin finish composition containing at least 0.15 weight percent novolak salt solids owf to fiber, such as nylon carpet fiber, by kiss-roll or metering applications, such as are used in spin finish application and heat-setting the resulting treated fiber. The novolak salt-containing spin finish composition can be co-applied with conventional spin finishes, i.e., non-aqueous lubricants when using this method.

The novolak salts are preferably used in an amount of at least 0.15 weight percent solids owf, more preferably 0.2 weight percent solids owf, most preferably at least 0.25 weight percent solids owf. Amounts in excess of 3 weight percent solids owf of the novolak salt generally does not provide any appreciable increase in stain resistance. The amount of novolak salt required to provide adequate stain resistance depends on the fibrous polyamide material being treated. For example, nylon 6 and wool generally require larger amounts of the novolak salt than nylon 66. When the polyamide material is heat-set carpet yarn, yarn which is heat-set under moist conditions, e.g., in an autoclave, the yarn generally requires larger amounts of the novolak salt than does yarn which is heat-set under substantially dry conditions. Mixtures of two or more novolak salts can also be used.

The supplemental divalent metal salts which can be used with the novolak salts to increase their efficiency include water-soluble inorganic and organic salts of metals such as magnesium, calcium, and zinc. When the supplemental divalent metal salts are used with the novolak salt, the amount of novolak salt may be reduced to as low as 0.1 weight percent owf or even 0.05 weight percent owf and still provide useful stain resistance. Inorganic metal salts include, for example, chlorides, sulfates, and nitrates of these metals. Organic metal salts include, for example, acetates and formates of these metals. Preferred supplemental divalent metal salts are magnesium sulfate, magnesium chloride and calcium chloride. Mixtures of two or more of the supplemental divalent metal salts can also be used in this invention.

When the supplemental divalent metal salts are added to the aqueous treating solution, the supplemental divalent metal salts are preferably used in an amount of at least 0.5 weight percent solids owf, more preferably at least 1 weight percent solids owf, most preferably at least 2 weight percent solids owf. Amounts of the supplemental divalent metal salt in excess of 5 weight percent solids owf generally do not provide any appreciable increase in stain resistance.

The fluorochemicals useful in the present invention for providing oil and water repellency include anionic, cationic, or nonionic fluorochemicals which are usually provided as aqueous emulsions, such as the fluorochemical allophanates disclosed in U.S. Pat. No. 4,606,737 (Stern); fluorochemical polyacrylates disclosed in U.S. Pat. Nos. 3,574,791 (Sherman et al.) and 4,147,851 (Raynolds); fluorochemical urethanes disclosed in U.S. Pat. No. 3,398,182 (Guenthner et al.); fluorochemical carbodiimides disclosed in U.S. Pat. No. 4,024,178 (Landucci); and fluorochemical guanidines disclosed in U.S. Pat. No. 4,540,497 (Chang et al.).

The fluorochemical, when included in the treating solution, is preferably present in an amount that is sufficient to retain on the fiber of the finished article about 200 to 1000 ppm fluorine based on the weight of the fiber. This can generally be achieved by using at least about 0.15 weight percent solids owf, more preferably at least 0.2 weight percent solids owf, most preferably 0.35 weight percent solids owf. Generally, amounts of the fluorochemical in excess of 2 weight percent solids owf do not appreciably improve the oil and water repellency.

The novolak salt can be applied to the fibrous polyamide material from an aqueous exhaust bath such as is used in beck dyeing of carpet. The novolak salt can be added to the aqueous dye bath solution and exhausted concurrently with the dye. Generally, the dye bath is maintained at a temperature at or near the boiling point for a period of 10 to 90 minutes or more to effect exhaustion of the dye and the novolak salt. Surprisingly, the dye bath can be maintained in the normal pH range normally used in dyeing of 4.5 to 8 with excellent results. Dye bath pH can range from 2 to 10. By adding supplemental divalent metal salt to the dye bath, improved stain resistance over an even broader pH range, i.e., 2-11, can be achieved. Typically, the weight ratio of dyebath to the fibrous polyamide materials is from 10:1 to 50:1.

Alternatively, the novolak salt can be added to the aqueous dye bath after exhaustion of the dye or the dyebath can be drained and fresh water added prior to the addition of the novolak salt. Generally, the bath is maintained at a temperature at or near boiling for a period of time sufficient to exhaust the novolak salt, usually 10 to 90 minutes. Typically, the weight ratio of dyebath to the fibrous polyamide materials is from 10:1 to 50:1.

The novolak salt can be applied during continuous dyeing, such as with Kuster ™ or Otting ™ carpet dyeing equipment. The novolak salt can be added directly to the aqueous dye solution and the solution is conventionally applied to the polyamide carpet. Alternatively, the novolak salt can be applied during a wetting-out step prior to application of the dye. The carpet is then steamed, as usual, for 3 to 5 minutes.

The novolak salt can also be applied to polyamide materials by a padding operation. This can be done as a separate step or in conjunction with the application of various conventional finishes such as wetting agents, softeners, and leveling agents. After application of the novolak salt solution and optional finishing agents, the polyamide material is conventionally dried.

As previously stated, the novolak salt can be applied to fibers and yarns as part of the fiber finish application. Fiber finishes are generally provided in the form of dilute aqueous emulsions or as non-aqueous solutions, or dispersions, which principally contain lubricant and antistatic agents as well as emulsifiers (surfactant) and may also contain materials such as bactericides and antioxidants. Representative lubricants include mineral oils, waxes, vegetable oils (triglycerides) such as coconut oil, peanut oil, and castor oil, synthetic oils, such as esters, polyoxyethylene derivatives of alcohols and acids, and silicone oils.

When the supplemental divalent metal salts are used in conjunction with the novolak salt, they are simply added in an appropriate amount to the treating solution. When fluorochemicals for providing oil and water repellency are applied in conjunction with the novolak salt during spin finish application, the fluorochemical is simply added to the finish composition.

The following non-limiting examples serve to illustrate the invention. In the following examples, all ratios are by weight and percentages are weight percent unless otherwise indicated. In the examples where the material being treated is nylon 66 carpet, the carpet is scoured, greige, unbacked, level-loop carpet unless otherwise indicated.

EXAMPLE 1

To a three-neck flask, fitted with a mechanical stirrer, thermometer, and condenser, were added 473 g of acetic anhydride and 945 g of 4,4'-dihydroxydiphenylsulfone. Then 473 g of concentrated sulfuric acid were added via a dropping funnel over a period of one hour with stirring. The resulting reaction mixture was heated and stirred at 100° C. for 7 hours. Water (340 g) was added in portions while distilling off acetic acid over one hour. After addition of 250 g of 37% aqueous formaldehyde and 338 g of water, the reaction mixture was heated to 100° C. for 6 hours. The resulting sulfonated 4,4'-dihydroxydiphenylsulfone-formaldehyde condensate was diluted with 1400 g of water and neutralized to a pH of 5.5 with 182 g of magnesium oxide to yield the substantially sulfonic acid-free, water-soluble magnesium salt of the partially sulfonated novolak resin product as a 41% aqueous concentrate.

EXAMPLE 2

The procedure of Example 1 was followed except that 204 g of zinc oxide were used to neutralize the sulfonated 4,4'-dihydroxydiphenylsulfone-formaldehyde condensate to a pH of 4.9 to yield the substantially sulfonic acid-free, water-soluble zinc salt of the partially sulfonated novolak resin product as an aqueous solution having a solids concentration of 42.4%.

EXAMPLE 3

The procedure of Example 1 was followed except that 423 g of calcium hydroxide was used to neutralize the sulfonated 4,4'-dihydroxydiphenylsulfone-formaldehyde condensate to a pH of 6.4 to yield the substantially sulfonic acid-free, water-soluble calcium salt of the partially sulfonated novolak resin product as an aqueous solution having a solids concentration of 16.2% after removal of precipitated calcium sulfate.

EXAMPLE 4

To a three-neck flask, fitted with a mechanical stirrer, thermometer, and condenser, were added 313 g of acetic anhydride and 625 g of 4,4-dihydroxydiphenylsulfone. Then 245 g of concentrated sulfuric acid were added via a dropping funnel over a period of one hour with stirring. The resulting reaction mixture was heated and stirred at 100° C. for 10 hours. Water (669 g) was added in portions while distilling off acetic acid over one hour. After addition of 145 g of 37% aqueous formaldehyde and 223 g of water, the reaction mixture was heated to 100° C. for 6 hours. The resulting sulfonated 4,4'-dihydroxydiphenyl-sulfone-formaldehyde condensate was diluted with 990 g of water and neutralized to a pH of 5.2 with 87 g of magnesium oxide to yield the substantially sulfonic acid-free, water-soluble magnesium salt of the partially sulfonated novolak resin product as a 41.3% aqueous concentrate.

EXAMPLE 5

The procedure of Example 4 was followed except that 177 g of zinc oxide were used to neutralize the sulfonated 4,4'-dihydroxydiphenylsulfone-formaldehyde condensate to a pH of 5.3 to yield the substantially sulfonic acid-free, water-soluble zinc salt of the partially sulfonated novolak resin product as an aqueous solution having a solids concentration of 41.6%.

EXAMPLE 6

To a three-neck flask, fitted with a mechanical stirrer, thermometer, and condenser were added 94 g phenol and 98 g concentrated sulfuric acid and the mixture was stirred and heated at 100° C. for two hours under nitrogen atmosphere to form phenolsulfonic acid. To this reaction mixture were added 193 g water and 37 g calcium hydroxide and this mixture was stirred and heated at 95° C. for two hours. The reaction mixture was filtered to remove precipitated calcium sulfate to yield a 39.4% aqueous solution of the phenolsulfonic acid calcium salt. A portion of this salt solution (98 g containing 38.6 g salt), 70 g 4,4'-dihydroxydiphenylsulfone, 38.5 g of 37% aqueous formaldehyde, and 7.4 g calcium hydroxide were reacted for 15 hours at 97° C. under nitrogen atmosphere to form the substantially sulfonic acid-free, water-soluble sulfonated 4,4'-dihydroxydiphenylsulfone-formaldehyde calcium salt. This calcium salt product was diluted to 30% solids using 106 g water and the pH was adjusted to 7.6 with 3.5 g calcium hydroxide.

COMPARATIVE EXAMPLE 1

The procedure of Example 1 was followed except that the sulfonated 4,4'-dihydroxydiphenylsulfone-formadehyde condensate was neutralized to a pH of 6.0 with 550 g of 50% sodium hydroxide to yield the sodium salt of the condensate as a 36% aqueous concentrate.

COMPARATIVE EXAMPLE 2

A sodium salt of condensation product similar to that of Ex. 6 was prepared, following the general procedure of Ex. 6 from 31 grams of phenolsulfonic acid monohydrate, 60 g of 4,4'-dihydroxydiphenyl sulfone, 31 g of 37% aqueous formaldehyde and 35 g of 50% sodium hydroxide to yield a 37.2% concentrate of sodium salt of the condensation product.

In the following examples, fibrous polyamide materials were evaluated using the following test methods:

Stain Resistance (SR)

One-hour test: A 1 g sample of the fibrous polyamide material under evaluation is placed in 40 ml aqueous solution containing 0.008 weight percent FD&C Red Dye No. 40 and 0.04 weight percent citric acid at room temperature (22° C.) and agitated for one hour. The sample is removed from the dye solution, rinsed and blotted with paper towels to remove excess moisture. The amount of staining is evaluated visually using a rating scale which ranges from 1-5, where 1 is essentially unstained and 5 is heavily stained. Generally, a stain resistance of less than 3 is satisfactory.

Eight-hour test: Ten ml of an aqueous solution containing 0.008 weight percent FD&C Red Dye No. 40 and 0.04 weight percent citric acid is poured onto the test sample and pressed into the sample using the rounded end of a 1.75 cm diameter test tube. The solution is allowed to remain on the test sample for eight hours at room temperature, i.e., about 22° C. The sample is rinsed under running tap water and then evaluated for staining using a graduated rating scale which ranges from 1 to 8, where 1 represents no discernable removal of the red dye stain and 8 represents complete removal of the red dye stain. In general, an eight-hour stain resistance of at least 4 is satisfactory.

Water Repellency (WR)

The water repellency of treated polyamide samples is measured using a water/isopropyl alcohol test, and is expressed in terms of a water repellency rating on a scale of 0 to 10 of the treated carpet or fabric. Treated carpets which are penetrated by or resistant only to a 100 percent water/0 percent isopropyl alcohol mixture (the least penetrating of the test mixtures) are given a rating of 0, whereas treated fabrics resistant to a 0 percent water/100 percent isopropyl alcohol mixture (the most penetrating of the test mixtures) are given a rating of 10. Other intermediate values are determined by use of other water/isopropyl alcohol mixtures, in which the percentage amounts of water and isopropyl alcohol are each multiples of 10. The water repellency rating corresponds to the most penetrating mixture which does not penetrate or wet the fabric after 10 seconds contact. In general, a water repellency rating of at least 1, is desirable for carpet.

Oil Repellency (OR)

The oil repellency of the treated polyamide samples is measured by a modified AATCC Standard Test 118-1978, which test is based on the resistance of treated fabric to penetration by oils of varying surface tensions. Treated fabrics resistant only to "Nujol", a brand of mineral oil and the least penetrating of the test oils, are given a rating of 1, whereas treated fabrics resistant to heptane (the most penetrating of the test oils) are given a value of 8. Other intermediate values are determined by use of other pure oils or mixtures of oils. The rated oil repellency corresponds to the most penetrating oil (or mixture of oils) which does not penetrate or wet the fabric after 10 seconds contact rather than the 30 seconds contact of the Standard Test. Higher numbers indicate better oil repellency. Additionally, a value of 0 indicates no resistance to "Nujol". In general, an oil repellency of at least 1 or greater is desirable for carpet.

EXAMPLE 7-18 AND COMPARATIVE EXAMPLES C3-C7

Samples of nylon 66 level-loop carpet which had been heat-set for 90 seconds at 195° C. and 30% relative humidity were immersed in aqueous baths containing various novolak salts. In Comparative Examples C4-C7, the sodium novolak salt of Comparative Example 1 was used. In Examples 7-10, the magnesium novolak salt of Example 1 was used. In Examples 11-14, the zinc novolak salt of Example 2 was used. In Examples 15-18, the calcium novolak salt of Example 3 was used. The type of salt, i.e., metal ion present, and amount are set forth in Table I. Each sample was immersed in the aqueous bath for 90 minutes at 97° C. at pH 5 (adjusted with acetic acid) using a 20:1 liquor to fabric ratio. For Comparative Example 3, the sample was treated as described above except that no novolak salt was applied. The treated samples were rinsed, dried for 20 minutes at 70° C. and 10 minutes at 130° C. and tested for stain resistance using both the one-hour and eight-hour tests. The test results are set forth in Table I.

TABLE I

| Example | Novolak salt | Novolak salt conc (owf) | Stain resistance 1-hour | Stain resistance 8-hour |
|---|---|---|---|---|
| C3 | none | — | 5 | 1 |
| C4 | Na | 0.05 | 3.5 | 2.5 |
| C5 | Na | 0.15 | 2 | 4 |
| C6 | Na | 0.25 | 1.5 | 5 |
| C7 | Na | 0.35 | 1 | 7 |
| 7 | Mg | 0.05 | 4 | 1 |
| 8 | Mg | 0.15 | 2 | 5 |
| 9 | Mg | 0.25 | 1 | 6.5 |
| 10 | Mg | 0.35 | 1 | 7 |
| 11 | Zn | 0.05 | 4 | 1.5 |
| 12 | Zn | 0.15 | 2 | 4 |
| 13 | Zn | 0.25 | 1 | 7 |
| 14 | Zn | 0.35 | 1 | 7 |
| 15 | Ca | 0.05 | 3 | 1.5 |
| 16 | Ca | 0.15 | 1.5 | 4.5 |
| 17 | Ca | 0.25 | 1 | 7 |
| 18 | Ca | 0.35 | 1 | 7.5 |

As can be seen from the data in Table I, the divalent novolak salts used in Example 7-18 generally provide improved stain resistance over the monovalent sodium novolak salt used in Comparative Examples C4-C7, particularly at the 0.25% and 0.35% solids owf concentrations.

EXAMPLES 19-31

Samples of nylon 66, level-loop carpet were heat set and treated as in Example 10, i.e., using 0.15% solids owf of the novolak calcium salt of Example 3, except that supplemental divalent metal salts, calcium chloride, magnesium acetate, and magnesium sulfate, as indicated in Table II, were added to the treating solution. Each sample was tested for one-hour and eight-hour stain resistance. The results are reported in Table II.

TABLE II

| Example | Supplemental metal salt | Metal salt conc (owf) | Stain resistance 1-hour | Stain resistance 8-hour |
|---|---|---|---|---|
| 19 | none | — | 1.5 | 7 |
| 20 | CaCl$_2$ | 0.25 | 1 | 7.5 |
| 21 | CaCl$_2$ | 0.50 | 1 | 7.5 |
| 22 | CaCl$_2$ | 1.00 | 1 | 8 |
| 23 | CaCl$_2$ | 2.00 | 1 | 8 |
| 24 | MgAc | 0.25 | 1.5 | 6.5 |
| 25 | MgAc | 0.50 | 1 | 6.5 |
| 26 | MgAc | 1.00 | 1 | 7 |
| 27 | MgAc | 2.00 | 1.5 | 8 |
| 28 | MgSO$_4$ | 0.25 | 1.5 | 7 |
| 29 | MgSO$_4$ | 0.50 | 1 | 6.5 |
| 30 | MgSO$_4$ | 1.00 | 1 | 7.5 |
| 31 | MgSO$_4$ | 2.00 | 1 | 8 |

As can be seen from the data in Table II, the addition of supplemental divalent metal salts to the novolak salt-containing treatment bath generally provides increased stain resistance.

EXAMPLES 32-41 AND COMPARATIVE EXAMPLES C8-C17

Samples of nylon 66 level loop carpet, heat set as in Examples 7-18, were treated with the calcium novolak salt of Example 3 in Examples 32-41 or the sodium novolak salt of Comparative Example 1 in Comparative Examples C8-C17 with the treatment procedure being the same as in Example 11, i.e., using 0.25% solids owf of the novolak salt except the pH of the treating bath was varied from 3 to 12 using acetic acid or sodium hydroxide as needed for pH adjustment. Samples were tested for stain resistance using the one-hour test. The solution pH and the stain resistance (SR) are reported in Table 3.

TABLE 3

| Calcium novolak salt | | | Sodium novolak salt | | |
|---|---|---|---|---|---|
| Example | pH | SR | Example | pH | SR |
| 32 | 3 | 1.5 | C8 | 3 | 1.5 |
| 33 | 4 | 1.5 | C9 | 4 | 1.5 |
| 34 | 5 | 1 | C10 | 5 | 2.0 |
| 35 | 6 | 1 | C11 | 6 | 2.0 |
| 36 | 7 | 1 | C12 | 7 | 2.0 |
| 37 | 8 | 1.5 | C13 | 8 | 2.0 |
| 38 | 9 | 1.5 | C14 | 9 | 2.5 |
| 39 | 10 | 2.5 | C15 | 10 | 3.0 |
| 40 | 11 | 5 | C16 | 11 | 5.0 |
| 41 | 12 | 5 | C17 | 12 | 5.0 |

As can be seen from the data in Table III, the divalent calcium novolak salt provides stain resistance superior to that provided by use of the monovalent sodium novolak salt over a wider pH range and particularly in the pH range of 7-10.

EXAMPLES 42-51 AND COMPARATIVE EXAMPLES C18-C27

Samples of nylon 66, level-loop carpet were prepared and treated as in Examples 32-41 and Comparative Examples C8-C17 except that 2% owf magnesium sulfate, a supplemental divalent metal salt, was added to the treatment bath. The samples were tested for stain resistance using the one-hour test. The solution pH and the stain resistance (SR) are reported in Table 4.

TABLE 4

| Calcium novolak salt | | | Sodium novolak salt | | |
|---|---|---|---|---|---|
| Example | pH | SR | Example | pH | SR |
| 42 | 3 | 1 | C18 | 3 | 1 |
| 43 | 4 | 1 | C19 | 4 | 1 |
| 44 | 5 | 1 | C20 | 5 | 1-1.5 |
| 45 | 6 | 1 | C21 | 6 | 1-1.5 |
| 46 | 7 | 1 | C22 | 7 | 1-1.5 |
| 47 | 8 | 1 | C23 | 8 | 1-1.5 |
| 48 | 9 | 1 | C24 | 9 | 1.5 |
| 49 | 10 | 2 | C25 | 10 | 2 |
| 50 | 11 | 2.5 | C26 | 11 | 3.5 |
| 51 | 12 | 4.5 | C27 | 12 | 4 |

As can be seen from the data in Table IV, addition of the supplemental divalent metal salt, magnesium sulfate, improves stain resistance over a wider pH range when used with the divalent calcium novolak salt than when used with the monovalent sodium novolak salt.

EXAMPLES 52-53

Samples of nylon 66 level-loop carpet were treated by padding (80% wet pickup) an aqueous solution containing 0.3% solids owf of the magnesium novolak salt of Example 1 in Example 52 or the zinc novolak salt of Example 2 in Example 53. Each sample was dried for 20 minutes at 70° C., heat set 5 minutes at 150° C., mock dyed for 90 minutes at 97° C., rinsed, and extracted, dried 20 minutes at 70° C. and 10 minutes at 130° C. The samples were then tested for stain resistance using the one-hour test. The carpet sample treated with the magnesium novolak salt had a stain resistance rating of 1.5 and the carpet sample treated with the zinc novolak salt had a stain resistance rating of 1-1.5, each showing excellent stain resistance.

EXAMPLE 54

Nylon 66, staple carpet fiber was treated with an aqueous emulsion of the zinc novolak salt of Example 2 and a fluorochemical for imparting oil and water repellency containing 25% FX-398 and 75% FX-399 (both fluorochemicals available from 3M Company) in combination with a 3.5% aqueous emulsion of a coconut oil-based fiber spin finish. The spin finish compositon was adjusted to provide 0.35% solids of the zinc novolak salt and 0.065% of the fluorochemical composition based on the weight of fiber. The spin finish was applied by a metered slot applicator. The treated yarn was heat-set under substantially dry conditions at 195° C. for about one minute and made into 40 oz/yd² cut pile saxony carpet, acid dyed, dried at 70° C. for 30 minutes, heated at 130° C. for 10 minutes and then evaluated for stain resistance using the eight hour test and for oil and water repellency. The stain resistance rating was 8, the oil repellency rating was 4, and the water repellency rating was 3.

EXAMPLE 55 AND COMPARATIVE EXAMPLE C28

Samples of nylon 66 level-loop carpet, heat set as in Examples 7-18, were treated as in Examples 7-18, using 0.3% solids owf of the calcium novolak salt of Example 6 in Example 55 and 0.3% solids owf of the sodium novolak salt of Comparative Example 2 in Comparative Example C28. The samples were tested for stain resistance using the one-hour test. The divalent calcium novolak salt provided a stain resistance rating of 1.5 while the monovalent sodium salt provided a stain resistance rating of 2.5.

Various modifications and alterations of this invention will be apparent to those skilled in the art without departing from the scope and spirit of this invention and this invention should not be restricted to that set forth herein for illustrative purposes.

What is claimed is:

1. A method for imparting fibrous polyamide materials with stain resistance to natural and synthetic acid colorants comprising contacting said materials with an aqueous treating solution comprising a sufficient amount of a sulfonated novolak resin composition comprising a normally solid, water-soluble divalent metal salt of a partially sulfonated novolak resin, said salt being substantially free of sulfonic acid moieties, in the treating solution for a sufficient time at a given temperature to impart the stain resistance.

2. The method of claim 1 wherein said contacting step comprises
adding to a dyebath, before, during, or after dyeing of the fibrous polyamide material, at least 0.15 weight percent solids based on the weight of the polyamide material of said composition,
immersing the polyamide material in the dyebath for a time and temperature sufficient to exhaust said compound onto the polyamide material, and further comprises,
removing the treated polyamide material from the dyebath, and
drying the removed polyamide material.

3. The method of claim 2 wherein said dyebath further contains supplemental divalent metal salt.

4. The method of claim 3 wherein said dyebath contains at least 0.5 weight percent supplemental divalent metal salt based on the weight of the polyamide material.

5. The method of claim 1 wherein said contacting step comprises
applying to the polyamide material an aqueous solution comprising at least 0.15 weight percent solids based on the weight of the polyamide material of said composition, and further comprises,
steaming the treated polyamide material for a time sufficient to effect adherence of said composition to the polyamide material, and
drying the steamed polyamide material.

6. The method of claim 3 wherein said aqueous solution further contains supplemental divalent metal salt.

7. The method of claim 6 wherein said supplemental divalent metal salt is present in an amount of at least 0.5 weight percent based on the weight of the polyamide material.

8. The method of claim 1 wherein said contacting step comprises
padding an aqueous solution comprising at least 0.15 weight percent solids based on the weight of the polyamide material of said composition onto the polyamide material, and further comprises, drying the padded polyamide material.

9. The method of claim 8 wherein said dyebath further contains supplemental divalent metal salt.

10. The method of claim 9 wherein said dyebath contains at least 0.5 weight percent supplemental divalent metal salt based on the weight of the polyamide material.

11. The method of claim 1 wherein said contacting step comprises applying a spin finish composition comprising at least 0.15 weight percent of said sulfonated novolak resin composition to polyamide yarn or fiber by kiss-roll or metering application and further comprises, heat-setting the fiber or yarn having said spin finish composition thereon.

12. The method of claim 11 further comprising co-applying a fluorochemical for imparting oil and water resistance to said polyamide yarn or fiber, with said compound.

13. The method of claim 1 wherein said aqueous solution further contains a supplemental divalent metal salt.

14. A fibrous polyamide material treated according to the method of claim 1.

* * * * *

UNITED STATES PATENT AND TRADEMARK OFFICE
CERTIFICATE OF CORRECTION

PATENT NO. : 5,098,774
DATED : March 24, 1992
INVENTOR(S) : John C. Chang It is certified that error appears in the above-identified patent and that said Letters Patent is hereby corrected as shown below:

[57] Abstract   "ae" should read -- are --

Col. 2, lines 13-14 "sulfomeihylated" should read -- sulfomethylated --

Signed and Sealed this

Nineteenth Day of October, 1993

*Attest:*

BRUCE LEHMAN

*Attesting Officer*    *Commissioner of Patents and Trademarks*